No. 624,061. Patented May 2, 1899.
A. MASSON & E. FORTIN.
MACHINE FOR PLANING TOOL STEEL.
(Application filed Oct. 10, 1898.)
(No Model.)
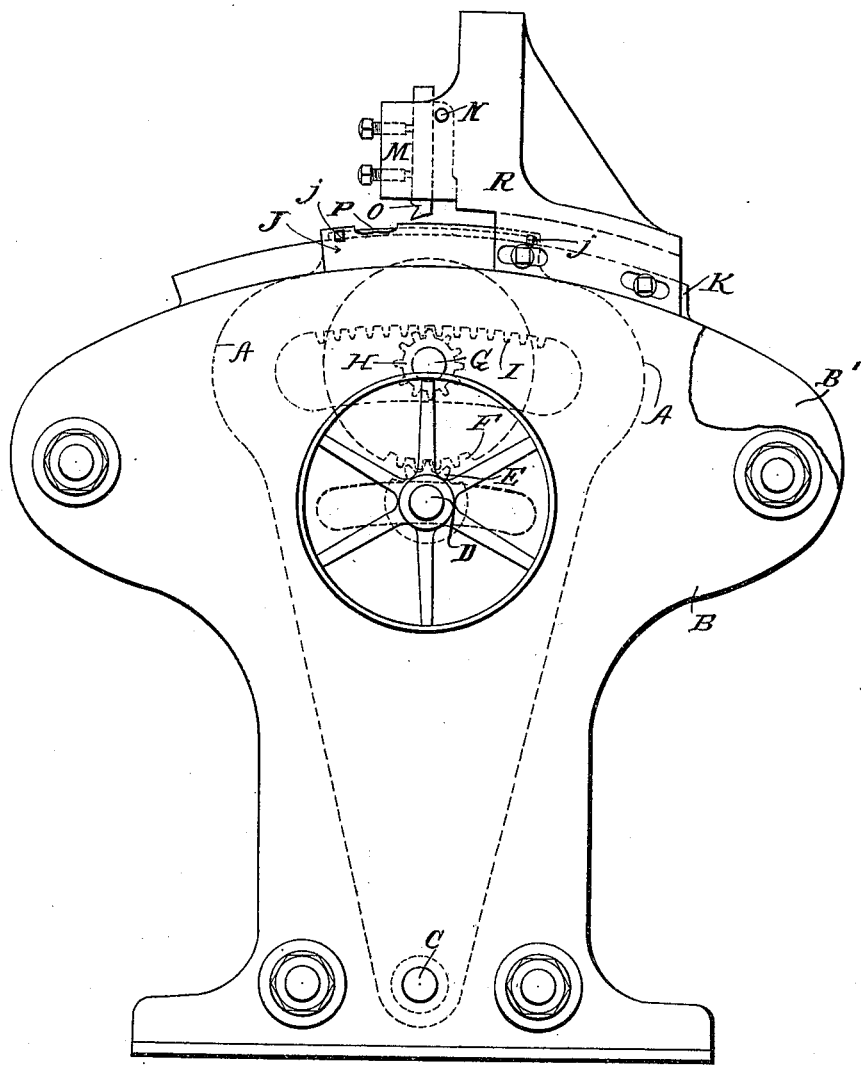

United States Patent Office.

ALFRED MASSON, OF BEAUVAIS, AND EDOUARD FORTIN, OF PARIS, FRANCE.

MACHINE FOR PLANING TOOL-STEEL.

SPECIFICATION forming part of Letters Patent No. 624,061, dated May 2, 1899.

Application filed October 10, 1898. Serial No. 693,183. (No model.)

*To all whom it may concern:*

Be it known that we, ALFRED MASSON, of Beauvais, (Oise,) and EDOUARD FORTIN, of Paris, in the Republic of France, have invented a new and useful Improvement in Machines for Planing Tool-Steel, which is fully set forth in the following specification.

This invention relates particularly to the production of cutting or turning tools having edges whose contour conforms to that of the finished article cut by them. Such tools are formed from bars or strips of steel, one side being fashioned by a file, bur, or plane, so that the cutting edge always preserves the same contour, regardless of the grinding of the end of the tool for the purpose of sharpening. When tools of this character are made by hand, the production is slow and costly and it is difficult to obtain tools of great length and of uniform contour. They are consequently usually made by planing, which requires machines of large size. Moreover, the surface left by the operation of an ordinary planing-machine being quite rough or corrugated, a long polishing with emery is required to finish the tool.

The special object of our invention is to provide a cheap and compact machine for the production of contoured tools for use in certain industries, such as the manufacture of pearl buttons, so that the manufacturers of such articles may quickly and economically fabricate tools of the special contour desired. This object is attained by the machine hereinafter described, and which is chiefly characterized by a table or work-holder, which oscillates in the arc of a circle and carries the tool-stock, and a rigidly-held mother-tool above the work-holder. The mother-tool is in a line radial of the circular path of the work-holder, being thus in a position in which its work is performed most efficiently, and it has been found that not only may a very large shaving be removed at each pass, but a surface so smooth is left that little or no polishing is required.

In the accompanying drawing, which forms part of this specification, is represented in elevation a machine constructed according to our invention.

The oscillating table or work-support (represented by A) is pivoted to C between two upright plates B B' and can move between them with slight friction. This movement in the arc of a circle is imparted from shaft D, either by hand or by any suitable motor. Shaft D carries a pinion E, which meshes with spur-gear F on shaft G, which also carries a pinion H. The latter engages a rack I, formed in the edge of a slot in work-table A, and by these means the oscillation of said table can be obtained and its amplitude and rapidity can be varied at will, according to the extent and rapidity of the movement imparted to pinion H.

Table A carries on its upper surface flanges J, between which is fixed, by set-screws $j$, (or in any suitable way,) the strip of steel or tool-stock P which is to be fashioned.

The tool-holder R rests upon one of the side plates B, being secured to the cheek K by bolts passing through slots therein, admitting of the adjustment of the position of the holder. The latter is of ordinary construction. Its fore part M, in which the mother-tool O is clamped, is pivoted to the main body of the holder at N, permitting the lifting of the tool during the return movement of the work-table.

We claim as our invention—

1. The combination with the work-table pivoted at its lower end between two plates constituting a fixed framework, a slot in the upper end of the work-table having rack-teeth along one edge thereof, a pinion located in said slot and engaging the rack-teeth, said pinion having bearings in the two plates, means for driving said pinion to oscillate the upper free end of the work-table, means for clamping the work to the table, and a stationary support for the mother-tool substantially as described.

2. The combination with the work-table pivoted at its lower end between two plates constituting a fixed framework, a slot in the upper end of the work-table having rack-teeth along one edge thereof, a pinion located in said slot and engaging the rack-teeth, said pinion having bearings in the two plates, means for driving said pinion to oscillate the upper free end of the work-table, means for clamping the work to the table, and an adjustable support for the mother-tool said support being stationary when the machine is in action, substantially as described.

In testimony whereof we have signed this specification in the presence of two subscribing witnesses.

ALFRED MASSON.
EDOUARD FORTIN.

Witnesses:
EDWARD P. MACLEAN,
OSKAR BRUCKMANN.